F. M. Stearns,
Grindstone Rest.

N° 45,650. Patented Dec. 27, 1864.

Witnesses.
G. N. Tibbitts
L. E. Winsor

Inventor.
Frank. W. Stearns.

UNITED STATES PATENT OFFICE.

FRANK M. STEARNS, OF BEREA, OHIO.

IMPROVEMENT IN RESTS FOR GRINDSTONES.

Specification forming part of Letters Patent No. 45,650, dated December 27, 1864; antedated December 2, 1862.

*To all whom it may concern:*

Be it known that I, FRANK M. STEARNS, of the town of Berea, in the county of Cuyahoga, in the State of Ohio, have invented a new and Improved Adjustable Rest to be Attached to Grindstones; and I do hereby declare that the following is a full and exact description thereof, reference being had to the accompanying drawings, and to the letters of reference marked thereon.

The nature of my invention consists in attaching a rest to the frame-work of a grindstone that may be adjusted to suit the convenience of the operator in grinding various tools, and is especially adapted to grinding mowing-machine cutters. By this means all the teeth of the cutters may be easily ground alike, and is applicable to any sized grindstone.

To enable others skilled in the art to make and use my invention, I will proceed to describe its construction and operation.

Figure 1:
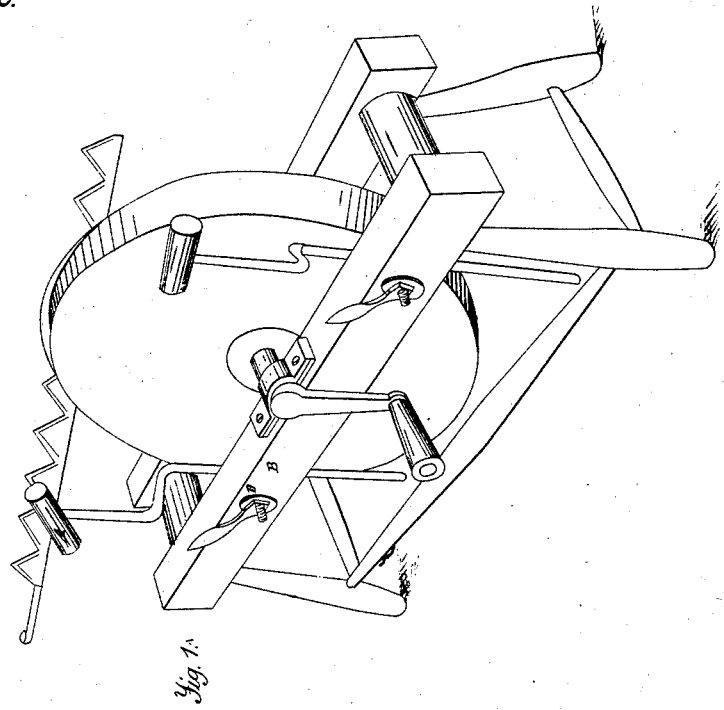
Figure 3:
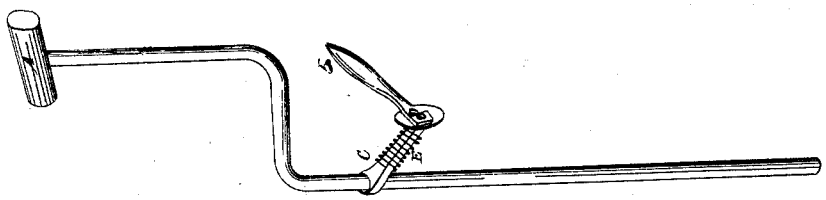
Figure 2:
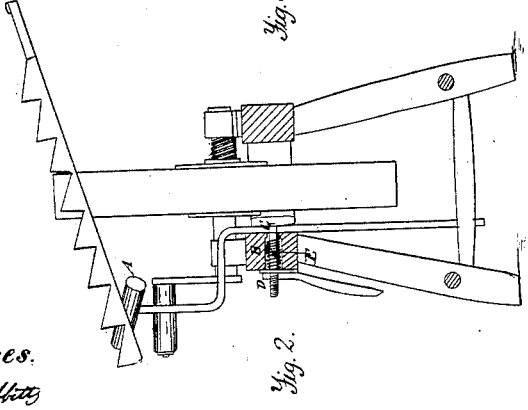

Figure 1 is a perspective view of a grindstone having my rest attached. Fig. 2 is a transverse section showing the manner of attaching the rest. Fig. 3 is a view of the rest detached.

I take a piece of round iron, of sufficient size to be stiff and strong, and bend in the form seen in Fig. 3, and provide it with a cross-piece, A, at the upper end. This iron rod I secure to the frame-work B by means of a clutch, C, which is made with an eye on one end, through which the rod passes, and a screw and nut, D, on the other. The hole through the frame B, for the reception of the clutch is made considerably larger than the clutch, except a short distance from the inside, which forms a shoulder for the spring E to bear against to prevent the rod from dropping down when the nut D is not screwed up tight. Now, when it is desired, the rest can be turned and twisted in any direction and held firmly in any position by screwing up the nut D, and is peculiarly adapted for holding mowing-machine cutters when grinding, as will be seen by reference to the accompanying drawings, enabling the operator to easily grind all the teeth alike. When the teeth are all ground on one side, the rest can be transferred to the other side of the stone for grinding the other.

What I claim as my invention, and desire to secure by Letters Patent, is—

The curved iron rod with its cross-head A, substantially as described, in combination with the clutch C, nut D, spring E, and frame B, as and for the purpose set forth.

FRANK M. STEARNS.

Witnesses:
 G. W. TIBBITTS,
 L. E. WINSOR.